(12) United States Patent
Morel et al.

(10) Patent No.: US 6,888,912 B2
(45) Date of Patent: May 3, 2005

(54) DEVICE FOR POSITIONING AND AXIALLY ALIGNING A FUEL ASSEMBLY AND PROCESS AND APPARATUS FOR RESTORING A POSITIONING ELEMENT

(75) Inventors: Gilles Morel, Saint Mard de Vaux (FR); Daniel Grypczynski, Lyons (FR); Sébastien Joly, Saint Marcel (FR)

(73) Assignee: Framatome ANP, Courbevoie (FR)

( * ) Notice: Subject to any disclaimer, the term of this patent is extended or adjusted under 35 U.S.C. 154(b) by 0 days.

(21) Appl. No.: 10/458,732

(22) Filed: Jun. 11, 2003

(65) Prior Publication Data
US 2004/0114704 A1 Jun. 17, 2004

(30) Foreign Application Priority Data
Jun. 11, 2002 (FR) ............................................. 02 07163
Apr. 4, 2003 (FR) ............................................. 03 04251

(51) Int. Cl.[7] ................................................ G21C 5/06
(52) U.S. Cl. ........................ 376/463; 376/362; 376/364; 376/260
(58) Field of Search ................................ 376/362, 364, 376/178, 463

(56) References Cited
U.S. PATENT DOCUMENTS
5,297,176 A 3/1994 Altman et al.

FOREIGN PATENT DOCUMENTS

| EP | 0164989 A | 12/1985 |
|----|-----------|---------|
| EP | 0164990 A | 12/1985 |
| FR | 2531563 A | 2/1984 |
| FR | 2651363 A | 3/1991 |
| FR | 2673031 A | 8/1992 |
| FR | 2673032 A | 9/1992 |
| FR | 2705822 A | 12/1994 |
| FR | 2717943 A | 9/1995 |

Primary Examiner—Harvey E. Behrend
(74) Attorney, Agent, or Firm—Connolly Bove Lodge & Hutz LLP

(57) ABSTRACT

The apparatus for positioning a fuel assembly (10) comprises, on a respective side of the core support plate (19) and the upper core plate (9) directed towards an endpiece (15, 14) of the fuel assembly (10) at least two projecting positioning pins (16, 22) adapted to engage in openings in the lower endpiece (15) or upper endpiece (14). Each of the positioning pins (16, 22) is fixed in a blind opening (24) comprising a threaded bore and a support surface perpendicular to the axis of the blind opening (24) and comprises a flange adapted to come into contact with the support surface when the positioning pin (16, 22) is screwed into the threaded bore. A gudgeon enables the positioning pin to be locked to secure it against unscrewing. The invention also relates to a process and apparatus for replacing damaged positioning pins on the core support plate (19) or on the upper core plate (9).

1 Claim, 14 Drawing Sheets

DEVICE FOR POSITIONING AND AXIALLY ALIGNING A FUEL ASSEMBLY AND PROCESS AND APPARATUS FOR RESTORING A POSITIONING ELEMENT

The invention relates to an element for positioning and axially aligning a fuel assembly in the core of a water cooled nuclear reactor and particularly a pressurised water-cooled nuclear reactor. The invention also relates to a process and apparatus for restoring a positioning element of the fuel assembly.

Pressurised water cooled nuclear reactors comprise inside a tank a core consisting of fuel assemblies of generally straight prismatic shape placed in juxtaposed arrangements with their axes running vertically.

The nuclear reactor comprises a support plate for the core of the nuclear reactor placed in a horizontal position inside the tank of the reactor, on which the fuel assemblies rest via a lower endpiece.

The core support plate constitutes some of the lower internal equipment of the nuclear reactor which comprises, above the core support plate, partitioning for holding the peripheral assemblies of the core and a cylindrical core envelope arranged in the tank in a coaxial position.

After the core of the nuclear reactor has been loaded by successively placing each of the core assemblies on the support plate inside the partitioning, upper internal equipment of the reactor is put into position above the core, this equipment comprising in particular an upper core plate bearing on the upper parts of the fuel assemblies constituting the upper endpieces of these assemblies.

The core assemblies are held inside the tank, in their operating position, by support or abutment means and positioning means for the upper internal equipment and lower internal equipment.

The fuel assemblies of the core must be kept in perfectly defined positions inside the operating nuclear reactor so that the cooling water of the reactor flowing vertically from bottom to top in contact with the assemblies of the core, after having passed through the lower support plate of the core through water accommodation openings is able to effectively cool all the fuel rods held in the frameworks of the fuel assemblies in the form of bundles of parallel rods.

The fuel assemblies are held perfectly aligned in juxtaposed positions by positioning elements at the level of the lower core plate and the level of the upper core plate. In particular, the core support plate and the upper core plate comprise positioning elements having positioning pins adapted to cooperate with the openings provided, respectively, through the lower endpieces and upper endpieces of the fuel assemblies.

The positioning elements generally consist of pins having means for fixing in the support plate or in the upper core plate, inside openings extending axially perpendicular to the plate, so that the positioning pins project either upwards in the case of the core support plate or downwards in the case of the upper core plate.

The lower endpiece of the fuel assemblies, which is generally square, has two openings arranged along a diagonal of the endpiece which are adapted to engage on two positioning studs projecting relative to the core support plate at locations which ensure adequate positioning of the fuel assembly.

When the core has been fully loaded, the fuel assemblies resting on the core support plate are positioned by means of the pins on which their lower endpieces engage in well defined relative positions which ensure perfect juxtaposition of the fuel assemblies in the core. After loading of the assemblies of the core the upper internal equipment which comprises a lower plate constituting the upper core plate is put back in position. This upper core plate comprises, as mentioned above, positioning pins which engage in openings in the upper endpieces of the fuel assemblies. The fuel assemblies are thus positioned and held at their bottom end and top end by the lower and upper core plates, respectively. This ensures perfect juxtaposition and axial alignment of the fuel assemblies inside the core. Also, by the fact that the upper internal equipment bears on the upper endpieces, the fuel assemblies are held counter to any lifting effect by the cooling water of the nuclear reactor circulating upwards in contact with the fuel assemblies of the core. The positioning studs for the elements for positioning and holding the fuel assemblies make it possible in particular to ensure that there is substantially constant play between the fuel assemblies along their entire periphery and over the entire surface of the core. This ensures regular distribution of the cooling water throughout the core of the nuclear reactor.

The positioning pins ensure on the one hand that the fuel assemblies are centred while the core is being loaded in the lower internal equipment and then centred and held relative to the upper internal equipment when they are put into position above the core. Moreover, the positioning pins ensure that the forces produced by the circulation of the cooling water during normal operation of the reactor are absorbed as mentioned above, as well as the forces produced in the event of an accident, for example of APRP type (Accident through loss of primary coolant) or during seismic activity. The positioning and maintenance of the perfect positioning of the fuel assemblies in the core therefore require the presence of all the positioning pins of the lower support plate of the core and of the upper core plate and perfect alignment of the positioning pins in the axial direction to ensure that the fuel assemblies are aligned. The positioning pins of the fuel assemblies are fixed in respective fixing openings in the core support plate and upper core plate which are produced so as to give perfect alignment of the positioning pins and hence perfect alignment of the fuel assemblies.

Generally, the fixing openings for the positioning pins in the upper core plate are through-openings in which part of the positioning pin engages, this part comprising in particular a threaded end onto which a nut is screwed from the upper part of the upper core plate in order to secure and lock the pin inside the fixing opening passing through the upper core plate. The centring and locking of the positioning pin inside the opening passing through the upper core plate may be carried out in different ways by providing contact surfaces for the pin and the fixing opening which are adapted to cooperate in order to ensure perfect alignment and centring.

The positioning pins are generally fixed to the core support plate inside blind openings comprising a threaded bore into which is screwed a threaded part of the positioning pin. The positioning pin is generally prevented from rotating by means of a washer which is itself secured against rotation and fixed by spot welds in a counter bore of the fixing opening for the core support plate.

The positioning pins of the fuel assemblies which comprise a part projecting below the upper core plate or above the core support plate may be damaged during handling of the fuel assemblies or the internal equipment of the reactor. This damage may take the form of deformation, for example bending, of the projecting part of the positioning pin and in some case may even amount to total breakage of the projecting part of the positioning pin.

If certain positioning pins are deformed and are no longer in perfect axial alignment it may be difficult to position the fuel assemblies in the core and/or the upper internal equipment above the core, which presupposes perfect engagement of the positioning pins projecting from the core support plate and below the upper core plate, into the openings in the lower or upper endpieces of the fuel assemblies. If the positioning of the fuel assemblies and upper internal equipment can be carried out, deformation of some positioning pins may lead to defective positioning of the fuel assemblies. The same is true if one or more positioning pins are missing from underneath the upper core plate. In this case, some of the fuel assemblies of the core might be positioned or held in defective positions inside the core. There may then be, for example, a considerable reduction in the play between adjacent fuel assemblies, resulting in an increase in the loss of charge in the circulation of the cooling water through the reactor. This loss of charge may be substantial enough to cause blockage of the water circulation along the fuel assemblies in at least one zone of the core. Then, in this poorly cooled zone of the core, overheating may occur which may result in the fusion of certain elements or fuel rods in the core assemblies.

In the case of positioning pins projecting relative to the upper core plate, at the lower end of the upper internal equipment, processes and apparatus for replacing pins comprising positioning studs which are defective or absent have been proposed. Generally, the replacement processes or apparatus require intervention above the upper core plate to gain access to the screws for fixing and securing the positioning pins. Such intervention from the top of the upper core plate requires dismantling and replacement of certain parts of the upper internal equipment, which means that the time taken to replace the positioning pins is extended and therefore the cost of the operation is increased.

EP-0.718.851 proposes an apparatus for aligning fuel assemblies comprising a positioning pin which can be removed and replaced entirely from below the upper core plate and upper internal equipment. However, the apparatus proposed is complex and requires the use of a screw-threaded locking element of the replacement pin.

In certain cases it has also been found that one or more positioning studs on the core support plate has been absent or deformed.

The positioning studs for the fuel assemblies on the support plate of the core generally consist of an end portion of a positioning pin which comprises, successively, in its axial direction, the positioning stud and a portion which is at least partially threaded adapted to be inserted and screwed into a screw thread in the opening of the core support plate. The positioning element for the fuel assembly comprises, in addition to the positioning pin, a washer for securing the pin against rotation, which comprises an opening having two straight edges in which part of the pin with two flat counter bores engages. The washer is inserted in a counter bore machined on the upper surface of the core support plate around the fixing opening for the pin, and fixed by spot welds.

When a fuel assembly positioning element is to be re-built as a result of the positioning pin being missing, damaged or broken, so that the positioning stud cannot be used any longer or is missing entirely, the work to restore the positioning element has to be done under water; in fact, the internal equipment of the nuclear reactor is irradiated after a period of operation of the nuclear reactor.

During a phase when the nuclear reactor has been shut down and cooled, the core of the reactor is reloaded and any repairs needed to the internal equipment of the tank are carried out.

After the lid of the tank has been opened under water, the upper internal equipment is dismantled and placed on an inspection and checking stand in the pool of the nuclear reactor, then the core assemblies are removed, which are generally emptied into a pool for the fuel.

It is then possible to gain access to the lower internal equipment, either in order to intervene directly on this lower internal equipment inside the tank of the reactor, or to transport it onto an inspection and repair stand in the pool of the reactor.

It is also possible to intervene on the upper internal equipment placed on the inspection and checking stand, for example in order to replace positioning pins on this upper internal equipment. It is therefore extremely important that the positioning pins for the apparatus for positioning and axially aligning the fuel assemblies are produced so as to assist their assembly on the new internal equipment in the factory and their replacement on worn internal equipment during a restoring operation carried out under water in a pool.

The aim of the invention is therefore to propose an element for positioning and axially aligning a fuel assembly in the core of a water cooled nuclear reactor, consisting of fuel assemblies of straight prismatic shape each resting, via a lower endpiece, on a horizontal support plate for the core, with its axis extending vertically, and held by an upper core plate resting on an upper endpiece of the fuel assembly, comprising, on a respective surface of the core support plate and upper core plate directed, respectively, towards the upper endpiece and the lower endpiece of the fuel assembly, at least two projecting positioning pins each fixed in an axial direction of alignment of the fuel assembly, inside a fixing opening for pins, in order to engage respectively in positioning openings in the lower endpiece and upper endpiece of the fuel assembly, this apparatus also assisting the initial mounting in the factory as well as any eventual replacement, on worn elements in the nuclear reactor, of positioning pins of fuel assemblies.

To this end:
- each of the fixing openings for pins in the core support plate and upper core plate comprises a blind threaded bore and a support surface perpendicular to the axial direction of the fixing opening having at least one dimension greater than a diameter of the blind threaded bore, extending around the bore,
- each of the positioning pins has a threaded shaft to enable it to be secured by screwing in the threaded bore of the fixing opening and an annular flange having a dimension greater than the diameter of the shaft for bearing on the support surface, and
- each of the positioning pins is retained, after screwing and locking in the core support plate or in the upper core plate, by a gudgeon engaging in the flange of the positioning pin and in a cavity in the corresponding plate and made inseparable from the positioning pin and the corresponding plate.

The invention also relates to a process for restoring a positioning element for a fuel assembly on a worn component of the nuclear reactor.

To ensure that the invention is properly understood, the core of a pressurised water cooled nuclear reactor, the positioning elements of a fuel assembly of the core and an operation for restoring a positioning element of a fuel assembly on the support plate of the core will now be described by way of example, with reference to the accompanying drawings.

FIG. 1 shows the tank of a pressurised water nuclear reactor generally designated 1 which is closed off at the top by a removable cover 2.

Figure 1:
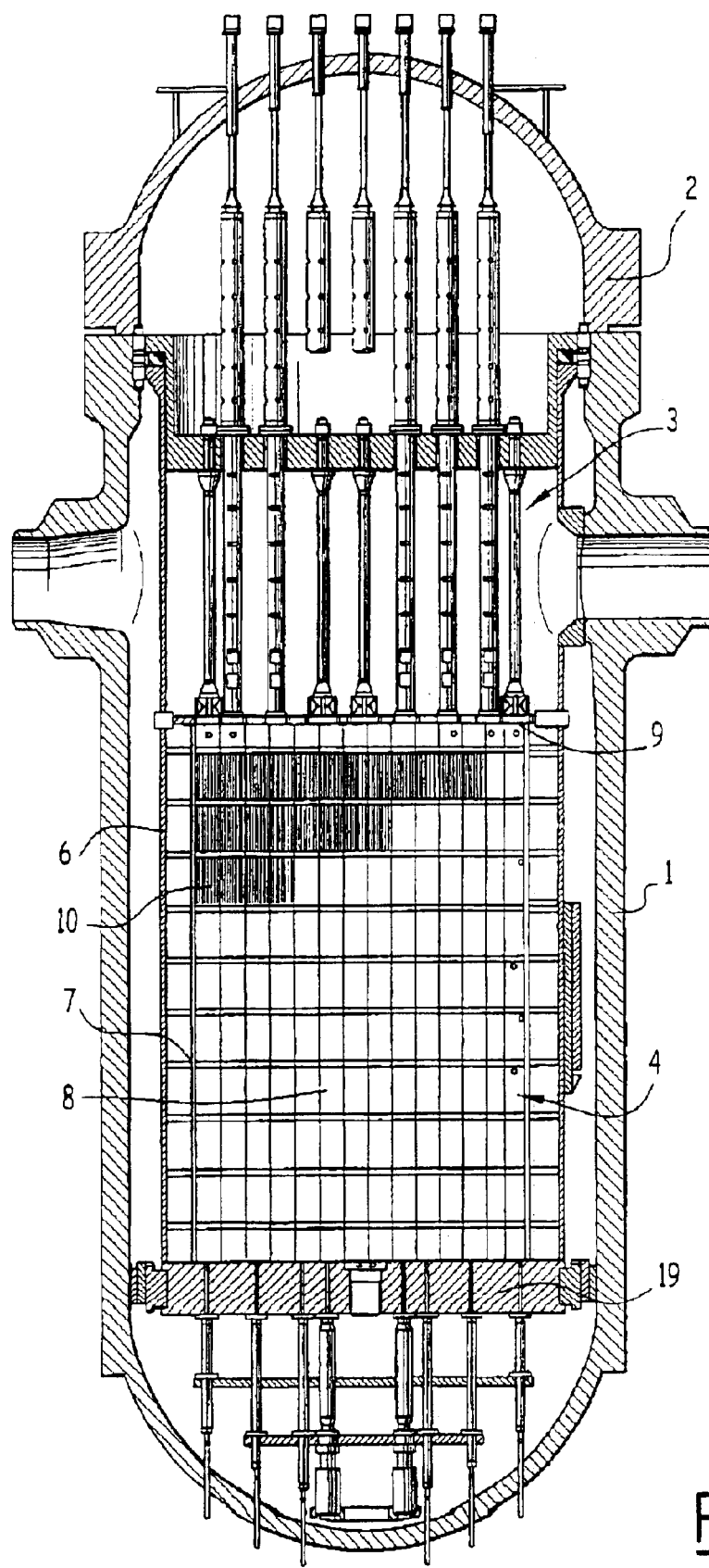
FIG. 1 is a section through a vertical plane of a tank of a pressurised water nuclear reactor containing the core of the nuclear reactor.

Inside the tank 1 are the upper internal equipment 3 and lower internal equipment 4 of the nuclear reactor. The lower internal equipment 4 comprises in particular the support plate 19 for the core of the reactor, a core envelope 6 suspended in a coaxial arrangement inside the tank 1 and integrally connected at its lower end to the core support plate 19 as well as partitioning 7 arranged inside the core envelope 6 and adapted to contain and hold the fuel assemblies which constitute the core 8 of the nuclear reactor.

The upper internal equipment 3 comprises in particular the guide tubes for the bars for controlling the reactivity of the core of the nuclear reactor and the upper core plate 9 by means of which the upper internal equipment 3 is made to bear on the upper parts of the fuel assemblies which constitute the core 8 of the nuclear reactor.

The fuel assemblies 10 which constitute the core of the nuclear reactor have a straight prismatic shape, generally a parallelepiped shape with a square base the axis of which is vertical in the operating position of the assemblies 10 inside the core.

Figure 2:
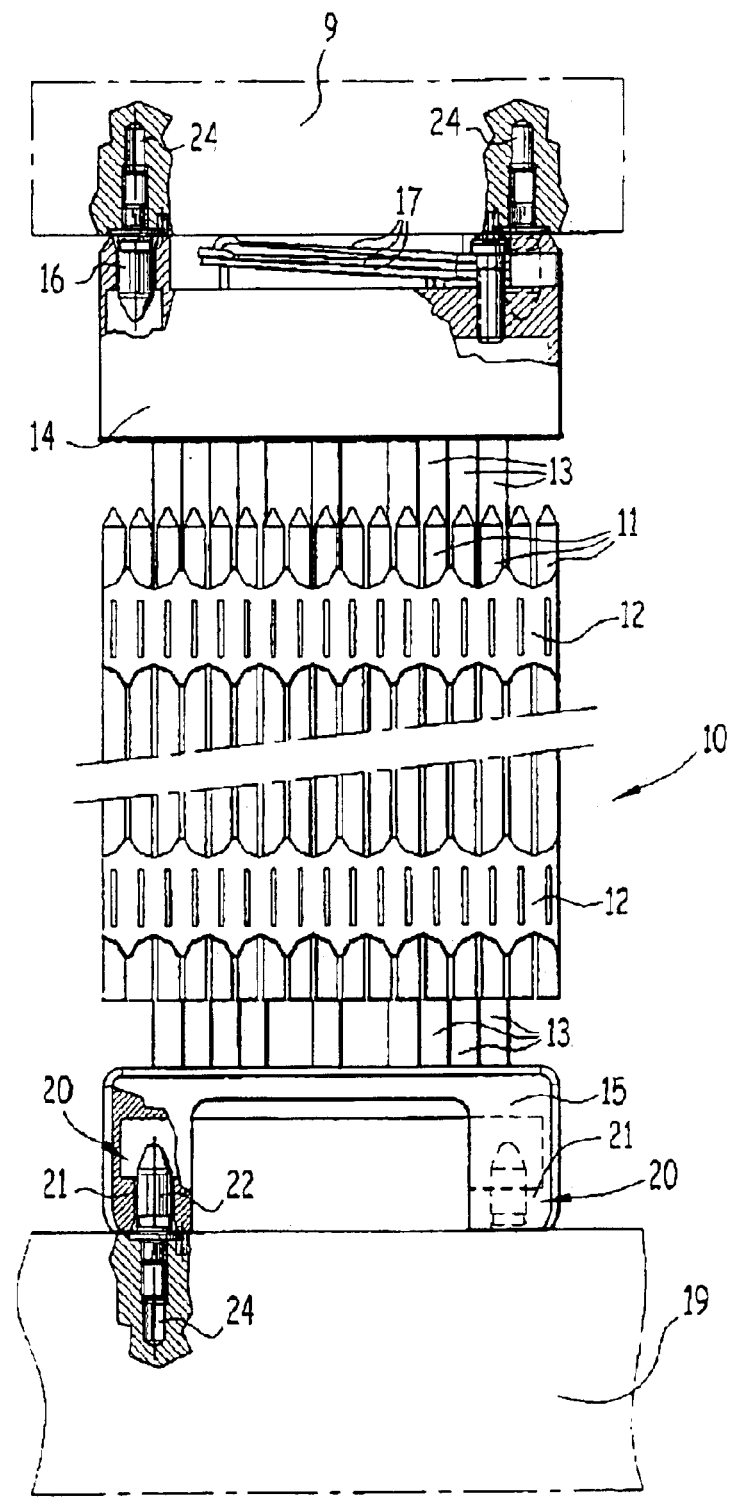
FIG. 2 is an elevation and partial section of a fuel assembly of the core of the nuclear reactor and a device for positioning and aligning the fuel assembly in the core of the nuclear reactor.

As can be seen from FIG. 2, each of the assemblies 10 of the core of the nuclear reactor consists of a set of fuel rods 11 arranged in the form of a bundle in which the elongated cylindrical rods are placed with their axes vertical inside a framework comprising in particular spacer grids 12 for holding the rods 11 in the form of a bundle in which the rods are arranged in a regular grid-shaped pattern in transverse planes perpendicular to the axial direction, guide tubes 13 connecting the spacer grids 12 distributed in the axial direction of the fuel assembly 10 and two endpieces 14 and 15 fixed to the end portions of the guide tubes 13 and closing off the fuel assembly.

The endpiece 14 provided at the upper end of the fuel assembly, known as the upper endpiece, comprises in particular openings for receiving positioning studs 16 fixed to the upper core plate 9 and a set of springs 17 on which the upper core plate 9 abuts in order to hold the fuel assembly while allowing longitudinal expansion of the fuel assembly in accordance with the temperature to which the fuel assembly is subjected.

The lower endpiece 15 of the generally square fuel assembly comprises, in each of its angles, a support foot which abuts on the core support plate 19 in the operating position of the fuel assembly 10. Two of the feet of the fuel assembly, arranged along a diagonal of the square endpiece, comprise openings 21 in each of which engages a stud of a positioning element 20 of the fuel assembly constituting the part projecting above the core support plate 19 of a positioning pin 22.

Figures 3, 4:
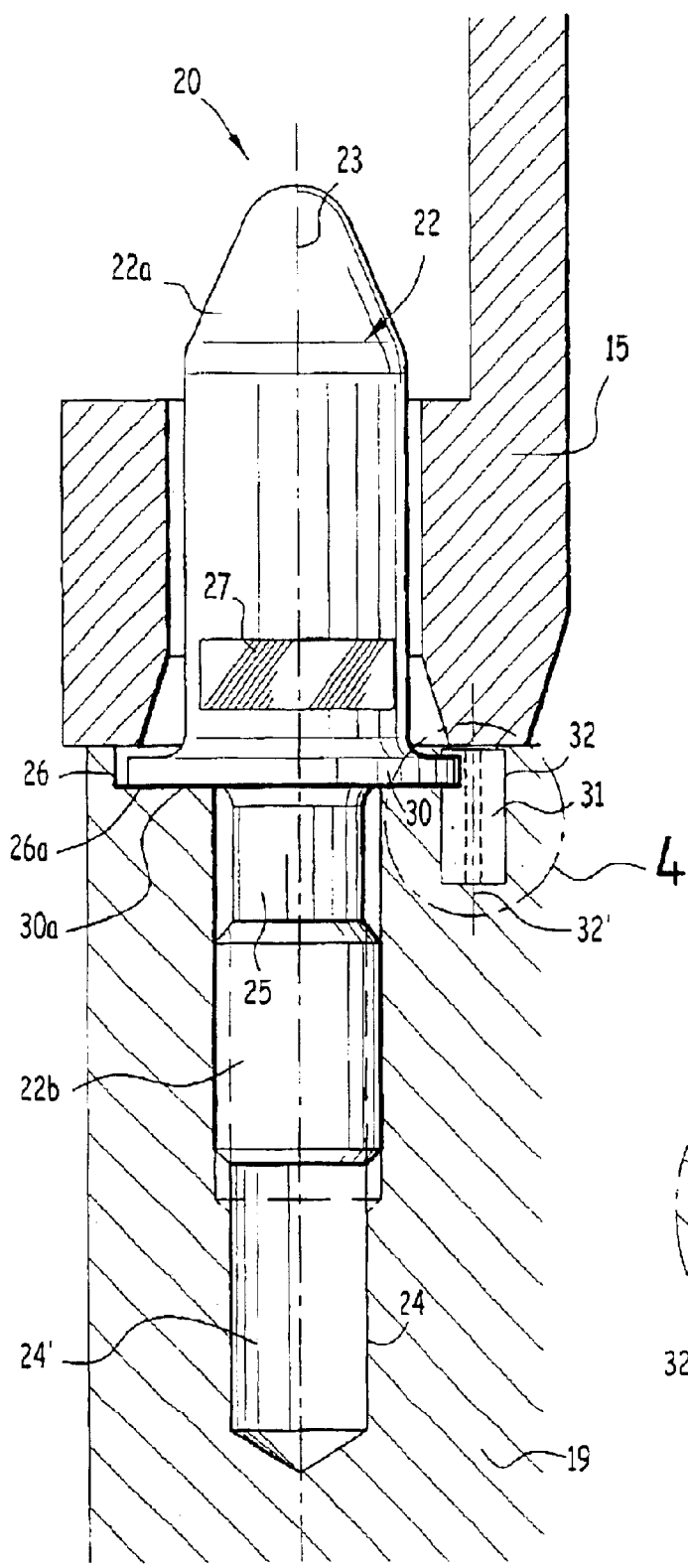
FIG. 3 is an elevation and partial section through a vertical plane of a positioning pin of a device for positioning a fuel assembly according to the invention.
FIG. 4 is an enlarged view of detail 4 in FIG. 3.

FIG. 3 shows an element for positioning the fuel assembly generally designated 20. By way of example, a positioning element is shown fixed to the core support plate 19 comprising a positioning stud adapted to engage in an opening in the lower endpiece 15 of the fuel assembly. The positioning element of the fuel assembly comprises positioning elements fixed to the lower core plate 5 and also positioning elements fixed underneath the upper core plate 9, as shown in FIG. 2.

We will not describe in detail how the positioning element 20 is fixed to the core support plate 19 and shown in FIG. 3, a positioning element fixed underneath the upper core plate 9 being produced in the same way as the element 20 shown in FIG. 3 but directed downwards and comprising a positioning stud projecting relative to the upper core plate, engaging in a positioning opening of the upper endpiece 14 of the fuel assembly.

The positioning element 20 shown in FIG. 3 comprises a positioning pin 22 having two main parts, the stud 22a adapted to project above the core support plate 19 in the axial direction 23 and a threaded fixing portion 22b in the axial extension of the stud 22a adapted to be screwed into a blind opening 24 in the core plate 19 which is threaded over at least part of its length. The fixing opening 24 of the positioning element 20 and the positioning pin 22 fixed in a coaxial arrangement inside the opening 24 constitute the entire positioning element 20.

The positioning element of each of the fuel assemblies comprises two positioning elements 20 at the core support plate 19 and two positioning elements at the upper core plate 9 which are positioned so that the studs for positioning and axially aligning these positioning elements engage, respectively, in two openings in the lower endpiece 15 of the fuel assembly and in two openings in the upper endpiece of the fuel assembly arranged along a diagonal of the endpiece.

The stud 22a of the positioning pin 22 has two flattened areas 27 used as gripping surfaces for a screwing tool when the pin is screwed into the threaded opening 24, either during the initial mounting of the fuel assembly positioning elements on the new internal equipment of the nuclear reactor or during the screwing of a replacement pin in a threaded opening in a worn piece of internal equipment, during an operation to restore positioning elements, as will be described hereinafter.

Between the stud 22a and the threaded portion 22b, the pin 22 comprises an annular flange 30 and optionally, following the flange 30, in the direction of the threaded portion 22b, a smooth portion 25 which is smaller in diameter than the threaded portion 22b.

The external diameter of the flange 30 is substantially equal to or slightly less than the diameter of a counter bore 26 machined in the upper part of the core support plate 19 around the opening 24.

The flange 30 comprises a flat lower surface 30a of annular shape adapted to bear against the surface 26a of the base of the counter bore, the contact of one of the surfaces 30a and 26a against the other being intended to ensure perfect positioning of the positioning pin and in particular a direction of the axis 23 of the positioning stud 22a which is perfectly perpendicular to the upper bearing surface of the core support plate 19. A perfectly coaxial position between the replacement pin 22 and the opening 24 is ensured, as will be described hereinafter, by the precision of positioning the axis of the threaded portion of the opening 24 adapted to accommodate the threaded portion 22b of the positioning pin 22.

As can be seen from FIGS. 3 and 4, the positioning element 20 further comprises a gudgeon 31 for securing the positioning pin 22, the gudgeon 31 being tubular in shape and engaging in a cavity 32 machined after the pin 22 has been put into position, through the flange 30 and in the core support plate 19, the cavity 32 having an axis 32' substantially at a tangent to the outer edge of the flange 30 and to the inner edge of the circular counter bore 26.

During the manufacture of the internal equipment of a new nuclear reactor in the factory, the fuel assembly positioning elements are produced by drilling the core support plate of the lower internal equipment and the upper core plate of the lower internal equipment and placing positioning pins analogous to the pin 22 shown in FIG. 3 in the openings thus produced.

The core support plate 19 is drilled from above so as to produce all the blind holes 24, each of which is adapted to receive a positioning pin 20 of a fuel assembly. Each of the blind holes 24, the axis 23 of which is perfectly aligned in the axial direction of the core of the nuclear reactor, is threaded and opens into a counter bore machined in the upper surface of the core support plate 5, the diameter of which is substantially greater than the diameter of the screw threaded blind hole 24, so that the screw threaded blind opening 24 is surrounded by a flat annual surface 26a constituting the base of the counter bore 26.

In the case of the positioning elements fixed underneath the upper core plate 9, a threaded blind bore is machined from the lower surface of the upper core plate, opening into a counter bore identical to the counter bore 26 shown in FIG. 3, along the lower surface of the upper core plate.

The positioning pins 22 for the fuel assemblies are all identical, whether they are intended to engage in screw threaded blind openings in the core support plate 5 or in the upper core plate 9.

The positioning pins 22, the shape of which is shown in FIG. 3, are screwed inside threaded blind openings in the core support plate 5 and upper core plate 9 until the flange 30 of the positioning pin 22 comes into contact with the annual flat surface 26a of the counter bore 26. The pin is tightened against the base of the counter bore with a constant couple. Then, a cavity 32 in which a gudgeon 30 engages, the fixing of which is completed by spot welds which fix it in the cavity 32 in the core support plate or in the upper core plate, is machined in the edge of the flange 30 and in the core support plate or the upper core plate into which the positioning pin is screwed.

After the nuclear reactor has been powered up, during maintenance operations, certain positioning pins for fuel assemblies may deteriorate and have to be replaced in the course of an operation of maintenance and repair carried out under water in a pool.

The positioning pins 22 are replaced by identical positioning pins which are put into position after the damaged replacement pins have been removed.

As will be explained hereinafter, when replacing a positioning pin according to the prior art with a replacement pin according to the invention, the operations of removing the damaged pins and fixing the replacement pins are carried out from above the plate to which the damaged pin is fixed (be it the core support plate or the upper core plate).

When replacing a damaged pin fixed to the upper surface of the core support plate, the operator gains access to the top surface of the core support plate after cooling the nuclear reactor, opening the cover of the tank, removing the upper internal equipment and the core assemblies, the pool and the reactor tank being filled with water.

When replacing a damaged positioning pin fixed to the upper core plate, at the lower end of the upper internal equipment of the reactor, the removal of the damaged positioning pin or pins and the installation and fixing of the replacement pins may be carried out after turning the upper internal equipment through 180° on its storage stand, so that the lower surface of the upper core plate is at the upper end of the upper internal equipment and directed upwards.

In every case, the damaged positioning pins fixed to the core support plate of the lower internal equipment of the reactor or to the upper core plate of the upper internal equipment of the reactor are removed by machining the welded parts of the locking gudgeon 31 of the positioning pin, removing the gudgeon from the cavity 32, then unscrewing the positioning pin screwed into the blind threaded opening in the corresponding plate.

In the event that it proves impossible to unscrew the positioning pin, this pin is machined, which may require re-machining and re-boring of the blind opening in the corresponding plate. In this case, the dimensions of the threaded portion of the replacement pin should take account of the re-machining and the thread diameter of the blind opening.

An operation to replace a fuel assembly positioning pin produced according to the prior art and fixed to a lower core plate 19 of a nuclear reactor will now be described.

Figure 5:
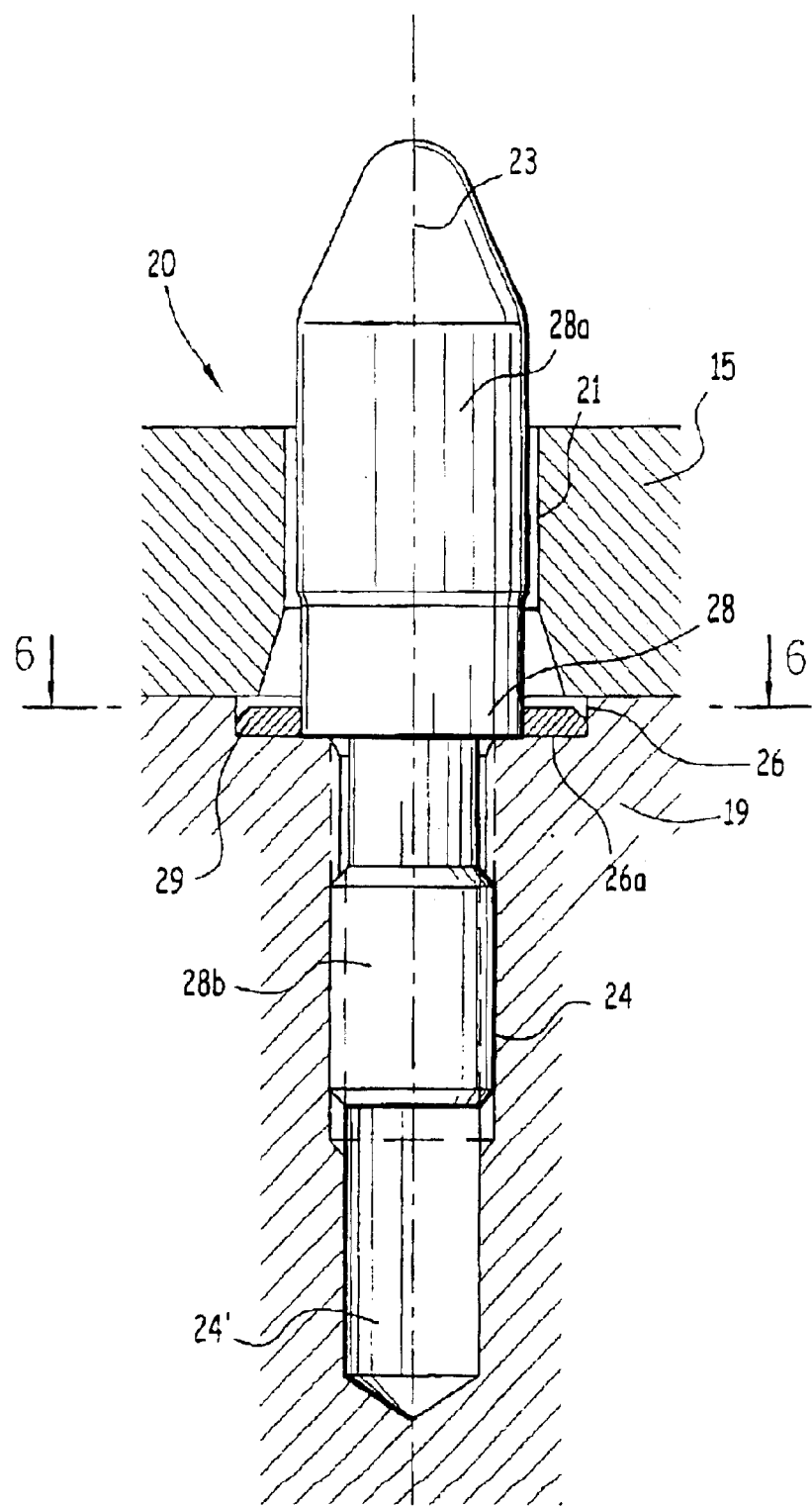
FIG. 5 is an elevation and section through a vertical plane of an element for positioning fuel assemblies on the core support plate of a nuclear reactor according to the prior art.

FIG. 5 shows a positioning element according to the prior art which comprises a positioning pin 28 having two main parts, the stud 28a adapted to project above the core support plate 19 in the axial direction 23 and a threaded fixing portion 28b on an axial extension of the stud 28a adapted to be screwed into a blind opening 24 in the core support plate 19 threaded over at least part of its length.

Figure 6:
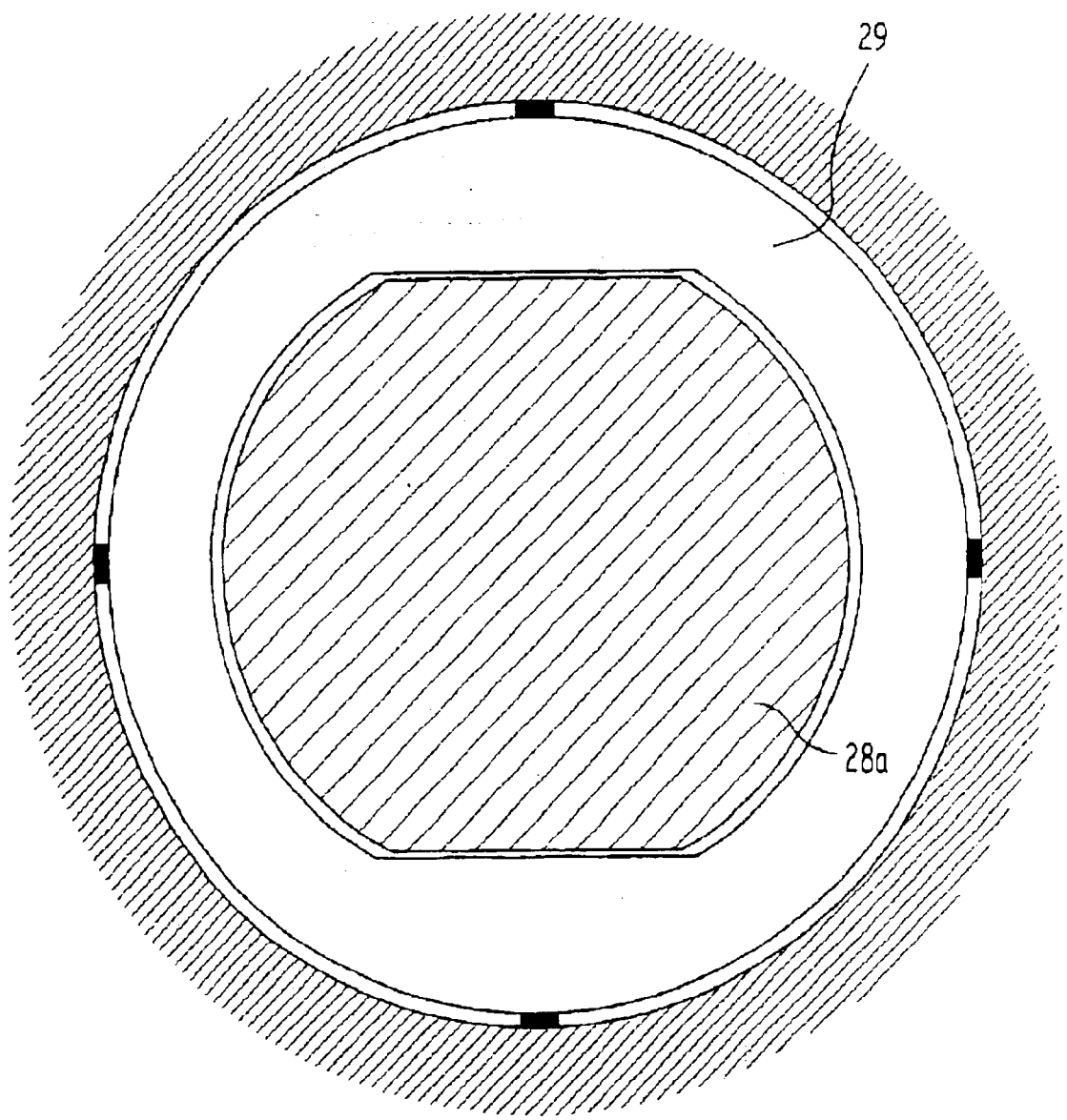
FIG. 6 is a cross section along 4—4 in FIG. 3, of the positioning element.

The positioning element 20 further comprises a securing washer 29 the central opening of which comprises two straight edges, as shown in FIG. 6, adapted to cooperate with two flattened areas of a lower part of the positioning stud 28a in order to secure the pin 28 against rotation relative to the securing washer 29.

For putting the positioning element into place on the core support plate 19, this operation being carried out in the factory during the construction of the nuclear reactor, the washer 29 is engaged on the lower end part of the positioning stud 28a comprising the flattened areas and the positioning pin 28 is screwed into the threaded opening 24 in the upper core plate 19 until a shoulder of the bushing 28 located at the lower end of the stud 28a comes into abutment with the base 26a of a circular counter bore 26 machined in the upper part of the core support plate 19, in a coaxial arrangement relative to the at least partially threaded opening 24. The washer 29 is then secured in the counter bore 26 by one or more spot welds. In this way the positioning element 20 is secured in position.

When a fuel assembly is being positioned on the core support plate 19, before the nuclear reactor is put into operation, a foot of the lower endpiece 15 of the fuel assembly engages the positioning stud 28a which comprises a rounded-off conical upper part so as to ensure that the foot of the fuel assembly is engaged and guided and then held by means of a cylindrical portion engaging in the opening 21 in the lower endpiece 15 with slight play.

Accidentally, one or more studs for positioning fuel assemblies on the core support plate 19 may be unavailable for positioning a fuel assembly of the core after a certain period of operation of the nuclear reactor.

Such a defect may be found, for example, where a pin has deteriorated, this deterioration possibly taking the form of a movement of the stud 28a relative to the theoretical axial direction 23, and this deterioration may amount to breakage of the pin, for example in the area of smallest diameter between the stud 28a and the threaded portion 28b. In this case, the stud 28a separates from the part of the pin which remains inside the opening 24 and may become a loose body in the primary circuit of the nuclear reactor. A loose body of this kind is detected immediately and requires the equipment of the nuclear reactor to be shut down, cooled and repaired.

In some case it is also possible that a positioning pin has not been properly secured during assembly.

In all these cases, the defective positioning element has to be repaired very fast, which is done after shut down and cooling of the nuclear reactor, discharge of the core and generally after removal of the lower internal equipment from the tank and placing this lower internal equipment on an intervention stand inside the pool of the reactor.

Owing to the need to ensure a perfectly coaxial position between the stud of the positioning element and the opening in the core support plate 19 and the impossibility of carrying out welding under water on the irradiated lower internal equipment, a replacement pin 22 as shown in FIG. 3, analogous to a positioning pin of the apparatus according to the invention is used to carry out the process of restoring the positioning element 20.

The replacement pin 22 comprises a positioning stud 22a the shape and dimensions of which are in every point identical to those of the stud 28a of a pin 28 originally fixed to the core support plate 19 of the nuclear reactor. However, the stud 22a has no flattened areas extending to its lower end, like the stud 28a for securing the pin, but only two flattened areas 27 used as a grouping surface for a screwing tool when the replacement pin 22 is screwed in at a final stage of the restoration process which will be described hereinafter.

The replacement pin 22 further comprises, on an extension of the axis 23 of the pin, a threaded portion 22b the diameter of which is generally greater than the diameter of the threaded portion 28b of the pin 28. Generally, the minimum diameter at the base of the thread of the threaded portion 28b of the replacement pin is at least equal to the maximum outer diameter of the threaded portion 28b of the bushing 28. In this way, in an operation to re-machine the opening 24 in the core support plate 19, all the initial threaded portion of this opening which may be defective can thus be eliminated.

In an alternative embodiment it is possible to provide a replacement bushing comprising a shaft which is longer than the shaft of a pin 28 according to the prior art originally fitted to core support plate 19, and a threaded portion at the end of the shaft of the replacement pin adapted to be screwed into an end portion 24' of the opening 24 on an axial extension and below the threaded portion adapted to receive the threaded portion 28b of a bushing 28.

Between the stud 22a and its threaded portion 22b, the replacement bushing 22 comprises an annular flange 30 and optionally, following the flange 30 in the direction of the threaded portion 28b, a smooth portion the diameter of which is less than the diameter of the threaded portion 22b.

The outer diameter of the flange 30 is substantially equal to or slightly less than the diameter of the counter bore 26 machined in the upper part of the core support plate 19 around the opening 24.

The flange 30 comprises a flat lower surface 30a of annular shape adapted to come to bear on the surface 26a of the base of the counter bore, the contact of the surfaces 30a and 26a on one another being intended to ensure perfect positioning of the replacement pin 22 and in particular the directing of the axis 23 of the positioning stud 22a perfectly perpendicularly to the upper support surface of the core support plate 19. A perfectly coaxial arrangement of the replacement pin 22 and the opening 24 is ensured, as will be described hereinafter, by the precision of construction of the axis of the threaded portion of the opening 24 adapted to receive the threaded portion 22b of the replacement bushing 22.

As can be seen from FIGS. 3 and 4, the positioning element 20 may further comprise a gudgeon 31 for securing the replacement pin 22, the gudgeon 31 being tubular and engaging in a cavity 32 machined after the pin 22 has been put into position, through the flange 30 and in the support plate 19, the cavity 32 having an axis 32' substantially at a tangent to the outer edge of the flange 30 and the inner edge of the circular counter bore 26.

Figure 7:
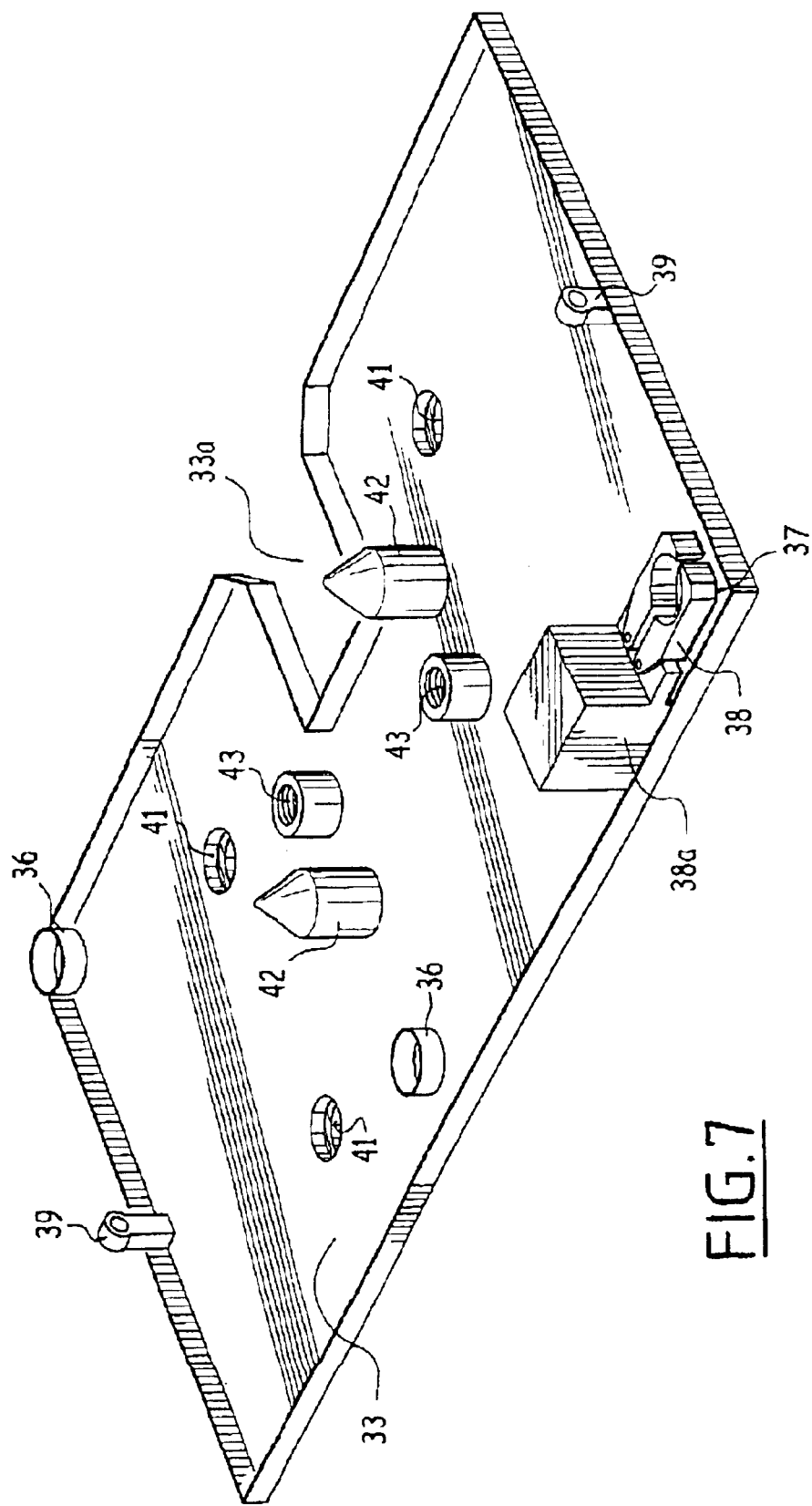
FIG. 7 is a perspective view of a tool support plate for carrying out the process according to the invention on the core support plate of a pressurised water nuclear reactor.

FIG. 7 shows a tool support 33 in the shape of a plate for mounting the tools required to carry out the restoration process according to the invention, on the core support plate 19 of the nuclear reactor.

Figure 8:
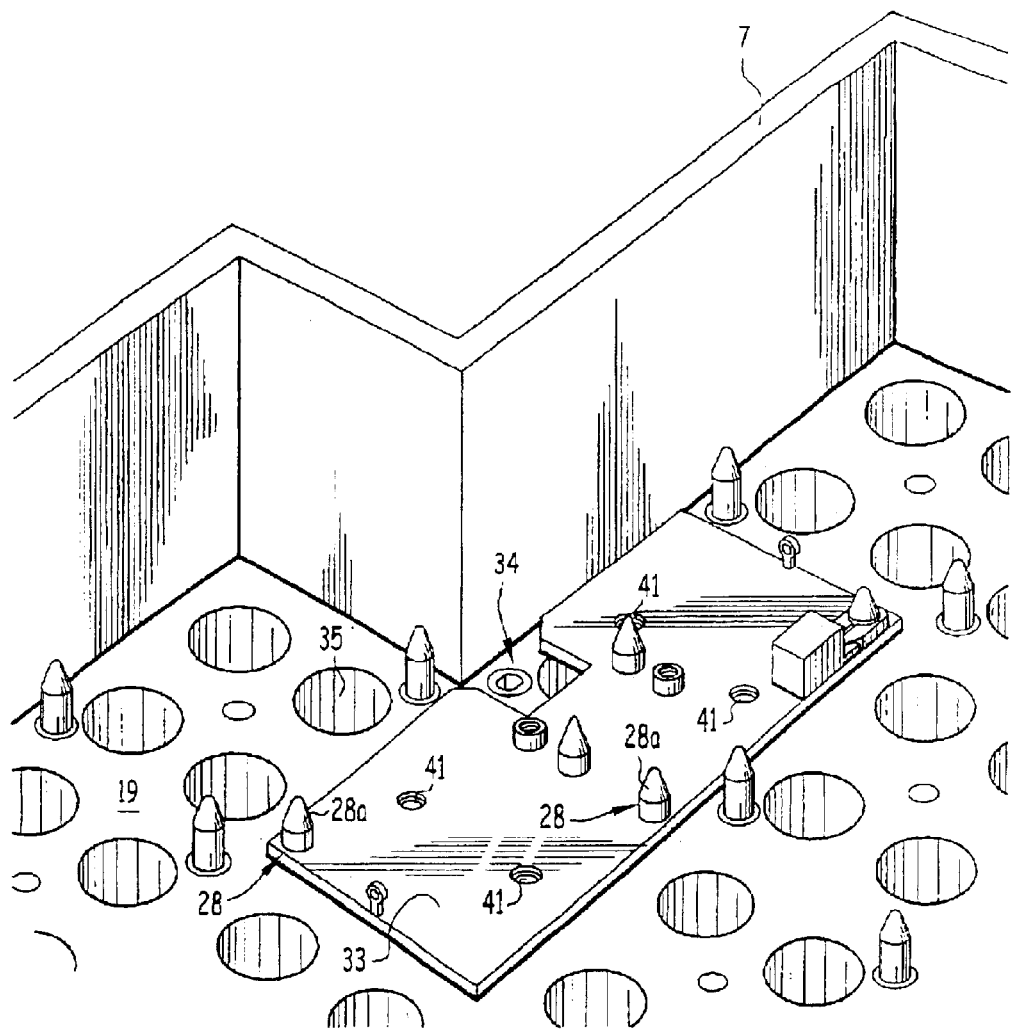
FIG. 8 is a perspective view of the tool support plate placed on the core support plate in order to restore a positioning element.

FIG. 8 shows the support 33 put into position on the upper core plate 19 in order to restore a positioning element, at a location 34 close to a partitioning wall 7 of the core.

The tool support 33 consists of a flat metal sheet with raised edges, substantially rectangular in shape and having a rectangular or square notch 33a giving access to position 34 of the positioning element which is to be restored.

The core support plate 19 shown in FIG. 8 is traversed by water accommodation openings 35 for accommodating the water used to cool the core and the fuel assembly positioning elements each comprising a positioning stud 28a projecting relative to the support plate 19.

In each of the positions of fuel assemblies of square cross section the core support plate 19 comprises two positioning elements each having a stud 28a projecting upwards above the core support plate. The elements for positioning a fuel assembly are disposed in the angles of the lower endpiece of the fuel assembly, at the level of the feet of the endpiece resting on the core support plate and arranged along a diagonal of the lower endpiece or the cross section of the fuel assembly. In each of the fuel assembly positions the core support plate 19 is also traversed by four water accommodation openings 35.

The tool support 33 comprises two openings 36 the diameter of which is substantially equal to or slightly greater than the diameter of a positioning stud 28a, the two openings 36 surrounded by a raised edge of the sheet metal constituting the plate 33 being in arrangements corresponding to the arrangement of two positioning studs 28a for a fuel assembly adjacent to the assembly in which a positioning element 34 is being restored.

The plate 33 for supporting and centring tools is also traversed by an opening 37 at which is placed a gripper 38 the tightening and loosening of which can be remote-controlled by a gripper control motor unit 38a. The two noses of the grippers 38 are produced so as to define between them a cylindrical opening on an extension of the opening 37 which, in a loosened position of the grippers, engages and introduces a stud 28a of a positioning element 28 for a fuel assembly. The opening 37 and the grippers 38 are arranged relative to the openings 36 and the notch 33a giving access to the zone of the positioning element 34 so that when the openings 36 engage on the positioning studs of an assembly adjacent to the assembly in which a positioning element is being restored, the opening 37 and the grippers 38 engage on a first stud 28 for positioning the fuel assembly on which the second positioning element 34 is being restored level with the notch 33a in the plate 33.

The tool support 33 further comprises four feet 41 projecting from its lower surface and two handling lugs 39 projecting from its upper surface enabling the positioning plate to be transported under water, inside the lower internal equipment of the nuclear reactor, to place it in a service position as shown in FIG. 8. The tool support 33 is lowered onto the core support plate 19 so that it is possible to engage the studs 28a of the two positioning elements 28 of the adjacent fuel assembly and, at the same time, the opening 37 and the grippers 38 in the opening position on the stud 28a of a first existing positioning element of the fuel assembly in which a missing second positioning element 34 is being restored. The tool support plate 33 is lowered until the feet 41 rest on the top surface of the support plate, the studs 28a of the positioning elements engaging in the corresponding openings 36 and 37 and between the noses of the grippers 38. The grippers 38 are then actuated so as to achieve precise positioning and placing of the tool support 33.

On its upper surface, the tool support 33 has two positioning studs 42 and two fixing bushings 43 operating by screwing a tool which is thus positioned and fixed precisely on the tool support 33. The position of the studs 42 and the screwing and fixing bushings 43 on the tool support plate 33 is such that the tool engaging on the studs 42 and fixed in the screwing bushings 43 by corresponding screw-type fixing elements can operate exactly along the axis of the opening 24 in the positioning element 34.

Figure 9:
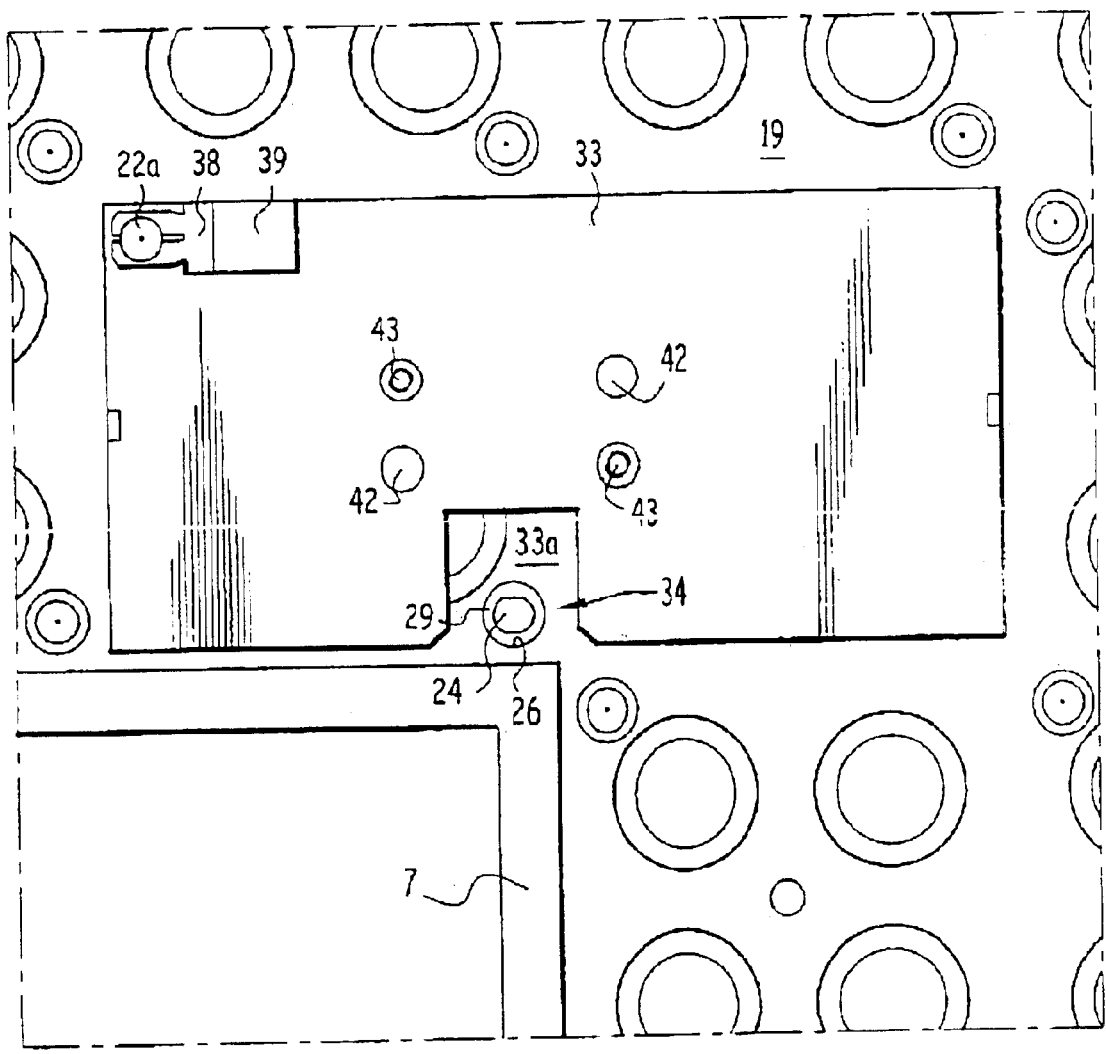
FIG. 9 is a plan view of the tool support plate in position on the core support plate.

FIG. 9 shows the different positioning and fixing elements of the support 33 and tools in a service position for restoring a positioning element 34 for fuel assemblies, adjacent to the partitioning 7.

Before its restoration the positioning element 34 has only the opening 24 which does not contain a positioning pin and the internal screw thread of which may have deteriorated and, in the counter bore 26 surrounding the opening 24, the washer 29 for securing a pin 28 against rotation, this pin having previously been removed by machining or lost.

Figure 10:
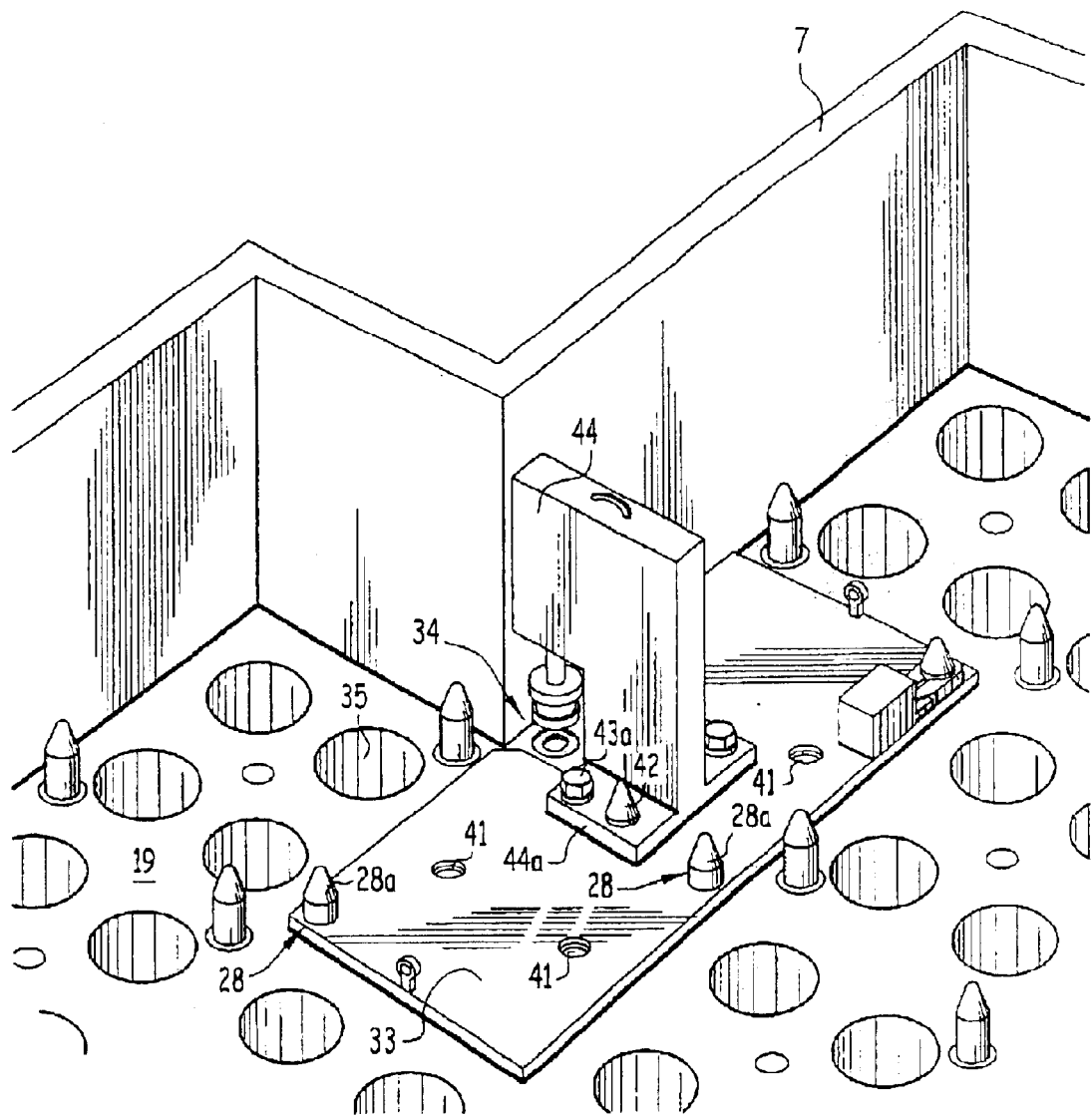
FIG. 10 is a perspective view of a machining tool in position on the tool support plate for carrying out the process according to the invention.

As can be seen from FIG. 10, a tool 44 for machining by electro-erosion, comprising a base 44a having two openings in positions which enable them to engage on the studs 42 on the tool support plate 33 and two screw-type openings 43a in positions corresponding to the screwing bushings 43, is mounted on the tool support 33 which has been precisely positioned on the core support plate 19, so as to ensure on the one hand that the tool support 44 is accurately positioned relative to the positioning element 34 which is to be restored and on the other hand that the tool 44 has been fixed in place.

Figure 11:
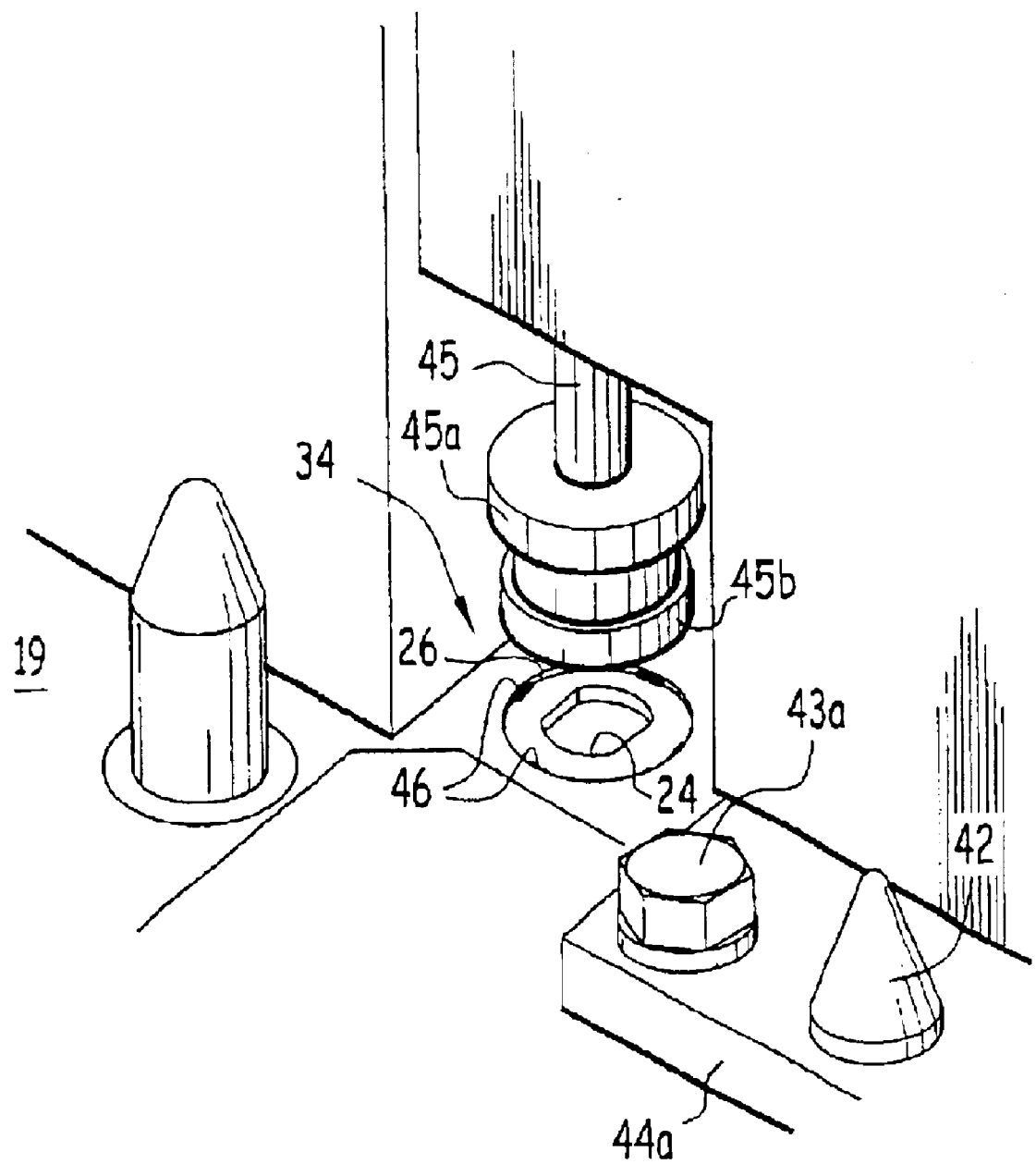
FIG. 11 is an enlarged perspective view of the end part of the machining tool shown in FIG. 10 during the machining step of the process according to the invention.
Figure 12:
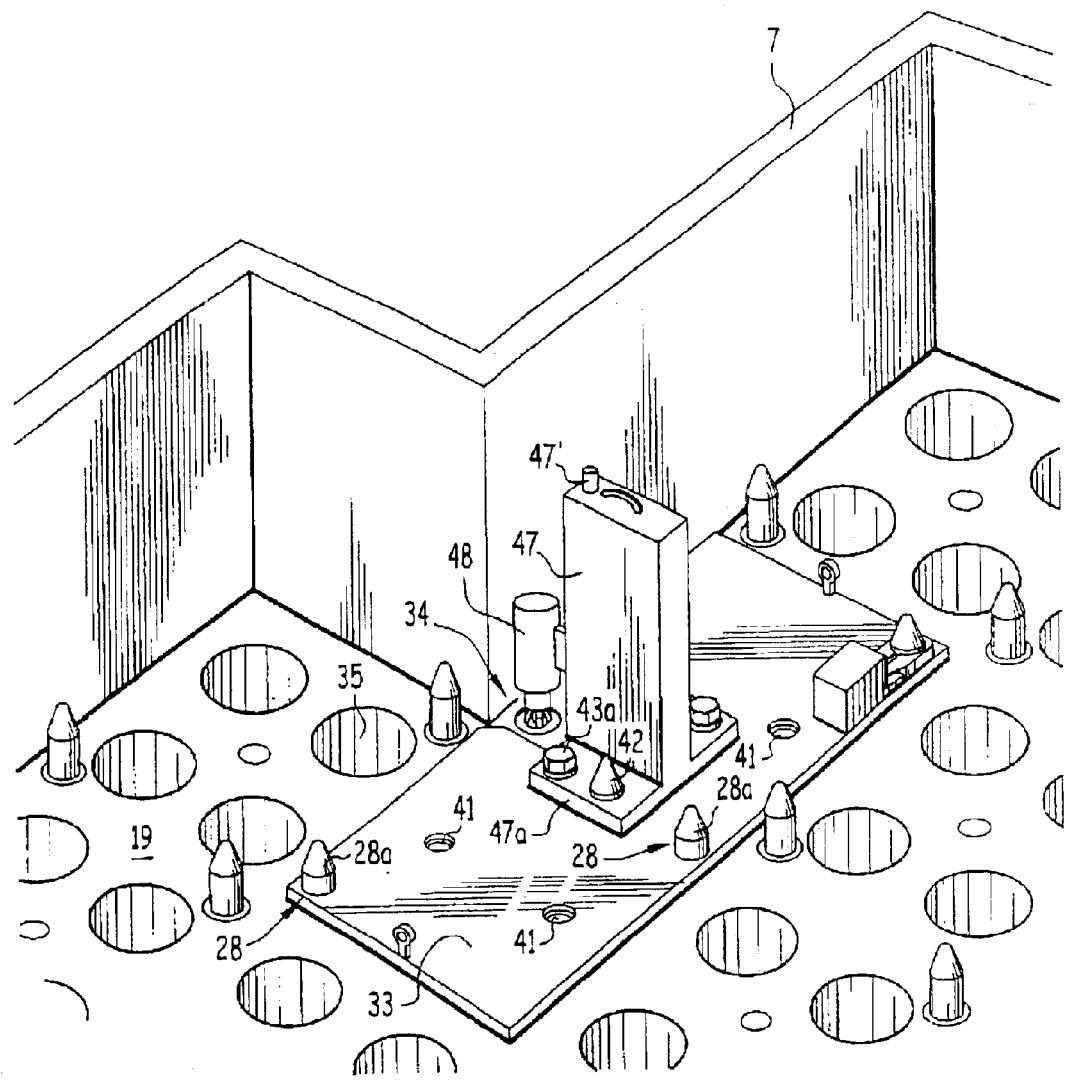
FIG. 12 is a perspective view of an extraction tool in the working position on the tool support plate during a stage of extracting the locking washer from the positioning element during the restoring process.

The tool 44 is an electro-erosion machine tool comprising, in particular, a pin 45 at the end of which is fixed an electrode carrier 45a supporting an electrode 45b (shown in FIG. 11 in particular).

When the tool 44 has been positioned and fixed in place on the support 33, the pin 45 carrying the electrode 45b via the electrode carrier 45a is axially aligned with the opening 24 in the positioning element to be restored, which comprises only the securing washer 29 lodged in the counter bore 26 and fixed in position by spot welds 46.

A first operation which should be carried out using the electro-erosion tool 44 is the elimination of the spot welds 46 so that the securing washer 29 can be removed from the counter bore 26, by an operation which will be described hereinafter and which requires the use of an extraction tool mounted on the tool support plate after removal of the electro-erosion tool 44.

A second operation of machining by electro-erosion inside the opening 24 consists in completely removing the original threaded portion of the opening 24 which may be defective and re-machining it to provide a new screw thread for fitting a replacement pin for the positioning element.

For each of these operations, either a suitably adapted and preadjusted electro-erosion tool is used comprising an electrode of the desired shape, or different suitably adapted electrodes, mounted in succession on a standard electro-erosion tool.

A third electro-erosion tool or a third type of electrode is used to carry out the drilling of the cavity 32 for positioning the tubular securing gudgeon 31, as will be described hereinafter. One or more electro-erosion machines are used, comprising an electro-erosion head with three motorised pins X, Y, Z. The direction Z, which corresponds to the axial direction of the opening 24, is directed along the axis of the pin and of the electrode which is moved in the direction Z to eliminate the welds 46 from the securing washer 29, from the screw threaded part of the opening 24 and to drill the cavity 32 for accommodating the tubular gudgeon 31.

The movements in directions X and Y are used to carry out the operations which require planetary movement of the electrode, for example to machine the screw thread inside the opening 24. The profile of the electrode and the travel of the electrode along the axis as well as the working parameters of the electro-erosion machine make it possible to obtain the desired geometry of the machined surfaces.

The machining operations could also be carried out with conventional mechanical cutting tools, for example a drill.

However, in every case, the machine chippings have to be collected in a container or particles from electro-erosion machining have to be recovered by filtering the water from the pool of the reactor.

As will be explained hereinafter, it is also possible to use guide barrels for the tools in order to carry out certain machining operations. In every case, perfect positioning of the working axis Z of the machine tool along the axis of the opening 24 in the positioning element 34 which is to be restored is achieved by flanging the tool support 33 using the grippers 38.

After the welds 46 have been removed from the securing washer 29, the electro-erosion machine tool is taken away and an extraction tool 47 is fixed to the tool support 33, this extraction tool 47 having a base 47a similar to the base 44a of the electro-erosion tool 44.

Figure 13:
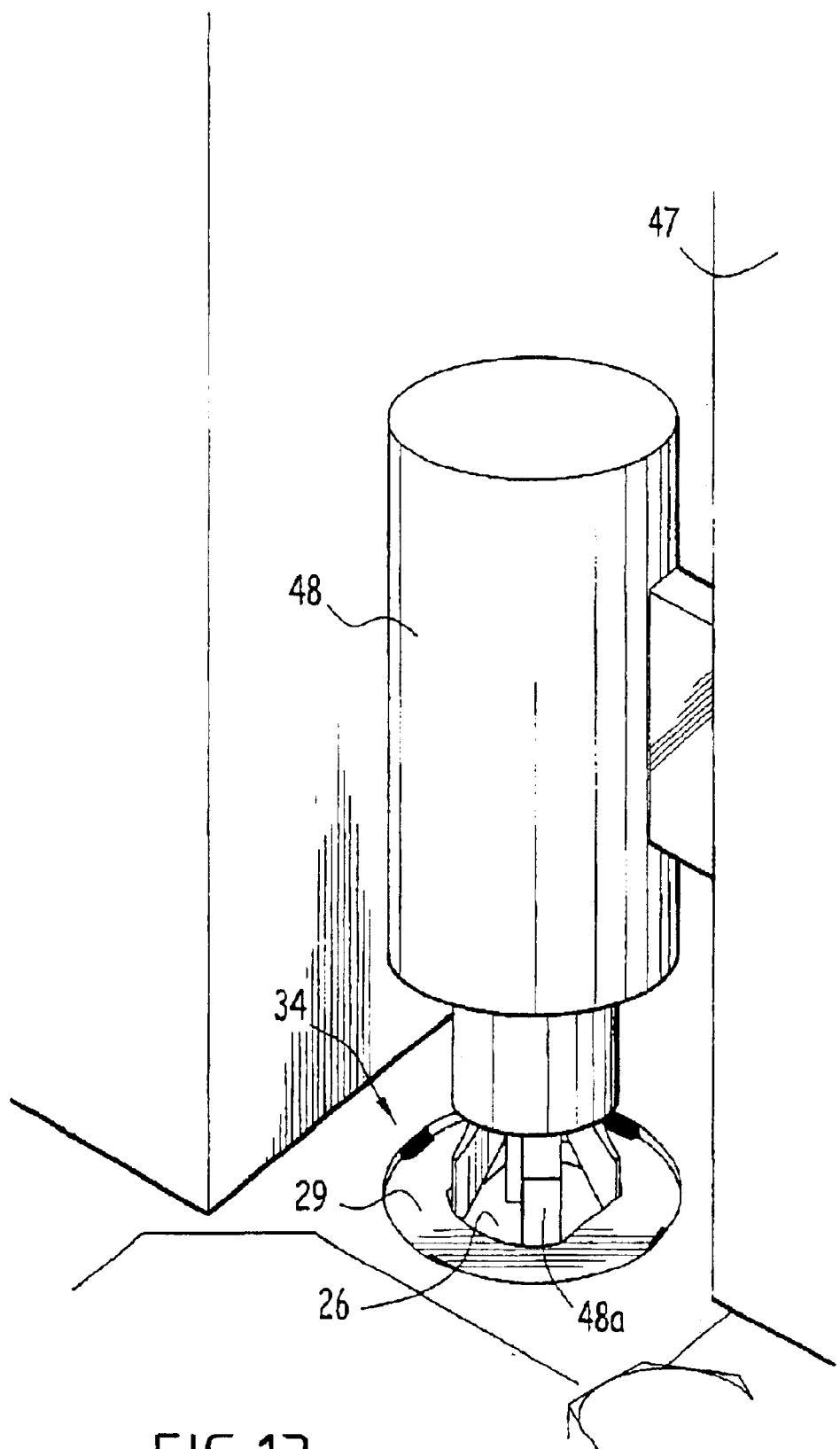
FIG. 13 is an enlarged view of part of the extraction tool in the working position above the positioning element which is to be rebuilt.

The extraction tool 47 comprises in particular grippers 48a (see FIG. 13) comprising four noses and a jack 48 for opening and closing the grippers 48a.

The actuating axis for the grippers 48a is directed along the axis of the opening 24 and of the washer 29 which is to removed from the counter bore 26, when the tool 47 has been fixed in place on the tool support plate 33 mounted so as to restore the positioning element 34.

The tool support 47 also comprises a mechanical connector 47' allowing actuation of a screw-type jack for moving the grippers 48a and the jack 48 for opening and closing the grippers in the vertical direction, either upwards or downwards.

After the tool 47 has been positioned on the support plate 33, the gripper is brought down into the closed position, i.e. into a position in which its fingers are close to one another, inside the bore of the washer 29 which has remained in place in the counter bore 26.

The jack 48 is then actuated to move the fingers of the grippers apart inside the bore and ensure that the securing washer 29 is gripped. Then, using a pole, the screw-type jack is actuated for raising the grippers 48a and the gripper control jack 48 in the vertical direction Z.

The washer is then recovered or the tool 47 is repositioned, the grippers 48a of which have remained in the position of gripping the washer 29.

Then a machining tool 44 such as an electro-erosion machining tool is put back into position in order to eliminate the original threaded portion from inside the opening 24 in the support plate, this threaded portion possibly being defective.

Other machining means analogous to the electro-erosion machine 44 are then used to create a new screw thread inside the opening 24, this new screw thread being produced so as to enable the threaded portion 22b of the replacement bushing 22 described above to be screwed in.

As explained hereinbefore, a replacement bushing 22 can be used, comprising a threaded portion wherein the diameter at the base of the thread is greater than the diameter at the base of the thread of the threaded portion of the opening 24 which is entirely eliminated, the opening 24 then being machined again at a diameter greater than its original diameter, as is shown in FIG. 3.

It is also possible to use a replacement bushing having a shaft which is longer than the shaft of a bushing 28 fitted to the core support plate and having a threaded portion at its end. In this case, the screw threading is provided in the end portion 24' of the blind opening 24 on an axial extension of the screw thread which has previously been eliminated.

Figure 14:
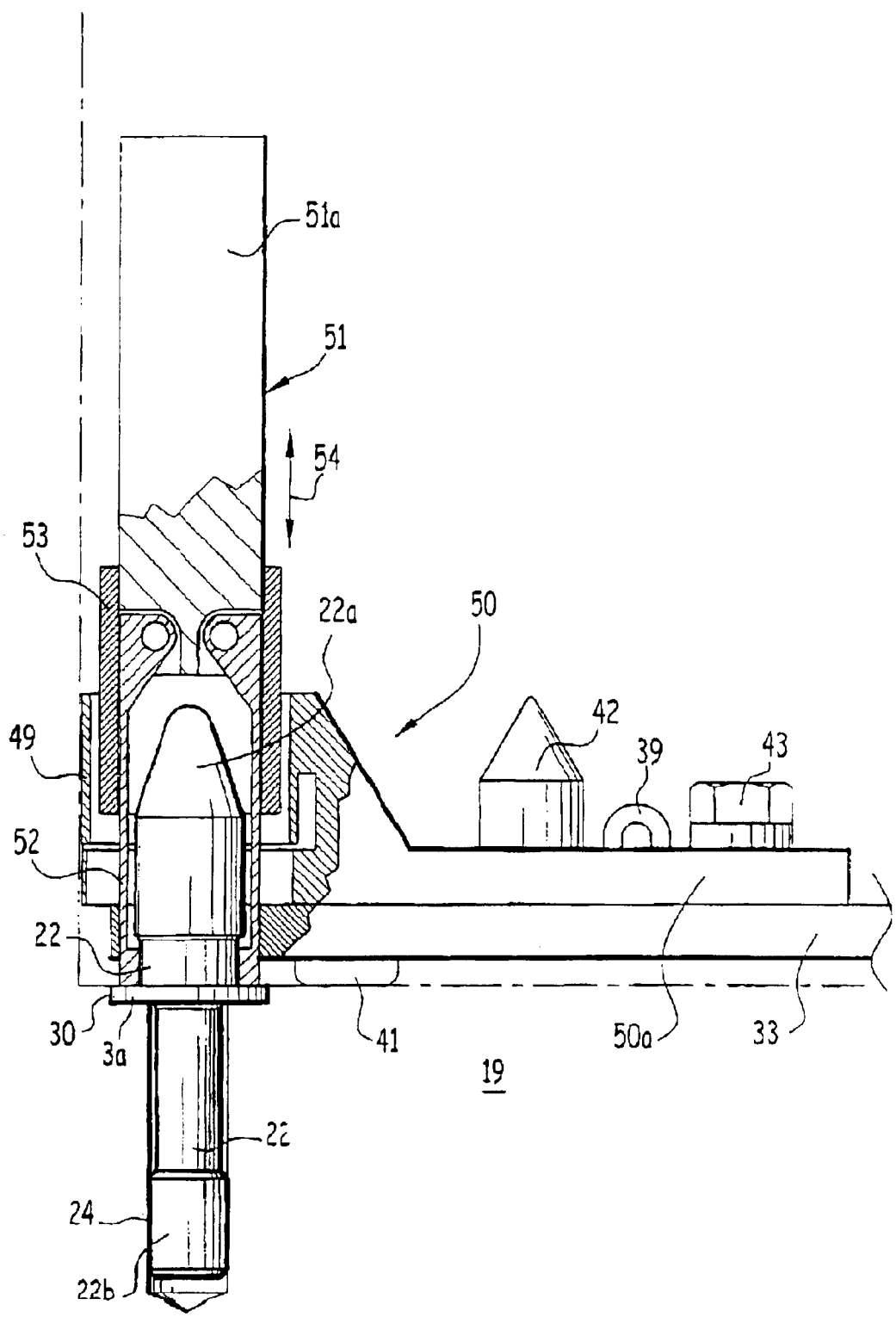
FIG. 14 is an elevation and partial section of a screwing tool for the replacement bushing used during a final step of the process for restoring the positioning element.

As shown in FIG. 14, the replacement pin 22 is then screwed into the opening 24 which has been formed and screw threaded. For this, a screwing tool is used which is operated manually by a pole from above the pool of the nuclear reactor and by means of a guiding and gripping tool as shown in FIG. 14. This guiding and gripping tool, generally designated 50, comprises a positioning and centring support 50a which may engage on the guide studs 42 and on the screwing bushings 43 of the tool support 33 fixed in place by screws engaging in the screwing bushings 43.

The support 50a for the guiding and gripping tool comprises a tubular guide 49 integral with the support 50a, which is placed in a position perfectly coaxial with the opening 24 when the support 50a of the tool 50 has been put into place on the support plate 33. A screwing tool 51 is used comprising a very long pole 51a, grippers 52 the fingers of which are mounted to be pivotable about axes perpendicular to the axis of the pole 51a at one end of the pole, and a sleeve 53 for locking and unlocking the grippers which can be controlled to move axially in one direction or the other, as shown in FIG. 14 (arrow 54), being guided on the outer surface of the fingers of the grippers 52 and on the end part of the pole 51a.

From a working position above the level of the pool of the reactor, a replacement bushing 22 is fixed to the end of the screwing tool 51, engaging the gripping ends of the fingers of the grippers 52 on the flattened areas 27 of the grippers 22 and sliding the locking ring 53 into its lower locking position. The replacement pin 22 fixed to the grippers 52 at the end of the pole 51 is lowered into the pool of the reactor until the replacement pin 22 and the grippers 52 held in the locked position by the sleeve 53 engage in the cylindrical guide 49 of the guide tool 50. The end of the replacement pin engages in the entry portion of the opening 24 the axis of which is aligned with the axis of the tube guide 49. The replacement pin 22 is screwed into the screw thread which has been remachined in the opening 24 until the flat lower surface 30a of the flange 30 comes to bear on the flat base 26a of the counterbore 26 machined around the opening 24 in the upper part of the core support plate 19.

Torque tightening is carried out, to ensure that there is no play between the stud and the core support plate. Torque tightening ensures that there is no wear that could occur in the presence of play in the reactor in operation.

It should be noted that in the course of the operations to remove the fixing welds from the securing washer 29 and to remove the washer, it is essential to take every precaution to avoid damaging the base 26a of the counterbore 26 which constitutes the abutment surface for the replacement pin 22 via the flange 30 which determines precise positioning of the replacement pin 22 and a perfectly vertical positioning of the positioning stud 22a.

Finally, the cavity 32 is drilled to accommodate the securing gudgeon 31 of the replacement pin.

For this, a machine tool is used, e.g. an electro erosion machine, which is placed on the tool support plate as described previously. The cavity 32 is drilled along the edge of the flange 30 and in an adjacent part of the core support plate, the axis 32' of the drill hole being substantially at a tangent to the edge of the flange 30 and to the edge of the counterbore 26, as is shown in FIG. 3.

A securing gudgeon 31, which may be a split tubular gudgeon, a drilled 1-piece pin or a tubular pin wound with a spiral section is inserted in the cavity 32. The cavity 32 for receiving the gudgeon 31 may be cylindrical or conical with or without a holding chamber and may comprise a locking groove. The gudgeon engaging in the cavity 32 is held in place by elasticity. Generally, a tubular gudgeon is used but if a solid cylindrical gudgeon is used it has to be drilled to produce a bore for evacuating water when it is placed in the cavity 32.

As shown in FIG. 6, the gudgeon 31 may be axially secured in the cavity 32 machined both in the flange 30 of the replacement pin and in the core support plate 19, by slight jagging 19' of the edge of the cavity 32 closest to the core support plate 19 or 30' of the edge of the cavity 32 closest to the flange 30 of the replacement pin 22. This prevents the gudgeon from escaping from its recess 32 during the operation of the nuclear reactor.

Because the replacement pin is generally made of stainless steel 316 whereas the core support plate is made of stainless steel 304, the jagging is preferably done on the edge of the cavity 32, closest to the flange 30 of the replacement pin 22 (jagging 30'), owing to the fact that the steel 316 of the replacement pin will withstand work hardening better than the steel 304 of the core support plate 19.

The insertion of the gudgeon 31 in the cavity 32 may be done by impact or by the action of a jack. Jagging is then carried out to ensure that the gudgeon cannot be lost.

The drilling of the cavity 32 is carried out in a zone selected as a function of the position of the holes for the passage of water in the core support plate and possibly the partitions for the peripheral assemblies of the core, so as to keep the area of the securing gudgeon as far as possible from the edges of the holes for the passage of water and the partitions.

Figure 15A:
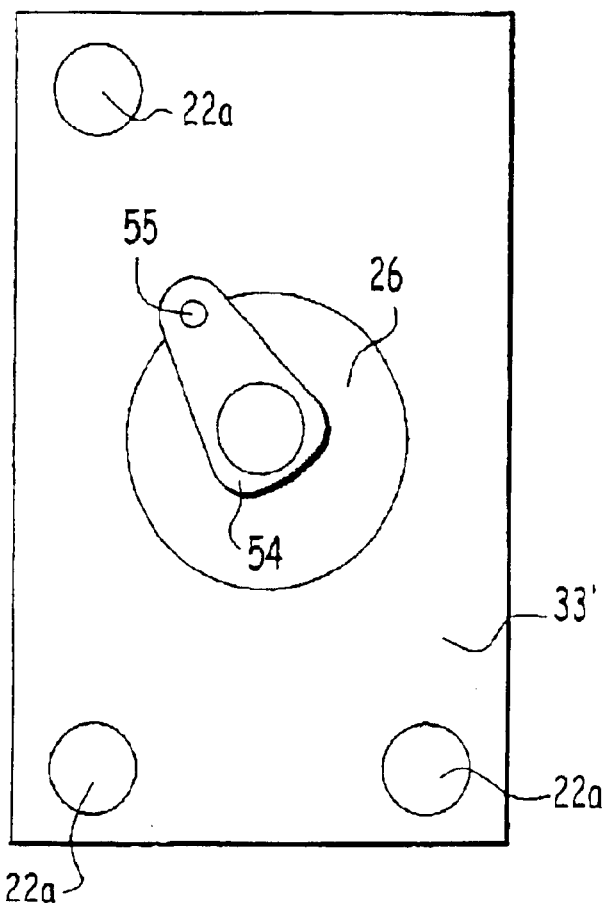
FIGS. 15A and 15B are a plan view and elevation, respectively, of centring means for tools used for carrying out the process according to the invention.
Figure 15B:
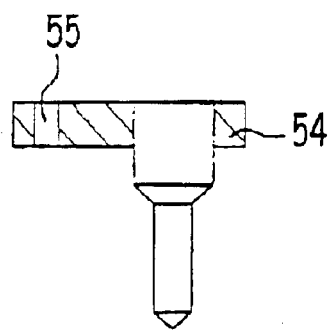

As shown in FIG. 15a, it is possible to achieve perfect centring of the tools such as the drilling or tapping tools, directly in the opening 24 of the positioning element which is to be restored.

The tool support plate 33' engages on studs 28a of the core support plate adjacent to the opening 24 in the positioning element which is to be restored. Preferably, the support plate 33', which comprises only three openings the diameter of which is very slightly greater than the diameter of the studs 28a, is engaged on the second stud 28a for guiding the fuel assembly in which a positioning element is being restored and on two studs 28a of adjacent assemblies.

A positioning tool 54 comprising a centring axis in the base of the opening 24 in the positioning element which is to be restored, below the threaded portion, is positioned in the opening 24 in the core support plate, through an opening in the tool support plate 33. The position of orientation of an upper plate of the centring means is fixed, bearing on the support plate 33 through which is provided an opening 55 to enable the drilling zone for receiving the securing gudgeon to be positioned precisely. The positioning tool 54 is used to position and centre a guide or barrel for positioning the base of a machine tool. After the removal of the positioning tool, the machining tool is put into position relative to these centring means. The positioning tool 54 could itself be used as a means for centring machining, extraction and screwing tools.

The devices for positioning fuel assemblies according to the invention may be produced and positioned equally well in the upper core plate of the lower internal equipment of the reactor as in the upper core plate of the upper internal equipment of the nuclear reactor.

Moreover, these elements can easily be restored when a positioning pin has been damaged during the handling of fuel assemblies or internal equipment of the nuclear reactor.

Furthermore, in the case of positioning elements produced according to the prior art comprising a securing washer, the restoration of these positioning elements can be carried out by replacing the damaged positioning pins of the elements according to the prior art with replacement positioning pins according to the invention.

The invention may apply to any water-cooled nuclear reactor comprising fuel assemblies resting on a core support plate and held by positioning elements projecting relative to the upper surface of the core support plate of the nuclear reactor and relative to the lower surface of the upper core plate.

What is claimed is:

1. Device for positioning and axially aligning a fuel assembly (10) in the core (8) of a water-cooled nuclear reactor, consisting of fuel assemblies (10) of straight prismatic shape, each resting, via a lower endpiece (15), on a horizontal support plate (19) of the core, with its axis vertical, and held by an upper core plate (9) resting on an upper endpiece (14) of the fuel assembly (10), comprising, on a respective surface of the core support plate (19) and of the upper core plate (9) directed, respectively, towards the upper endpiece (14) and towards the lower endpiece (15) of the fuel assembly, at least two projecting positioning pins (16, 22) each fixed in an axial direction of alignment of the fuel assembly (10), inside a pin fixing opening (24, 26), to engage respectively in positioning openings for the lower endpiece (15) and the upper endpiece (14) of the fuel assembly (10), characterised in that:

each of the fixing openings for positioning pins (16, 22) in the core support plate (19) and upper core plate (9) comprises a blind threaded bore (24) and a support surface (26a) perpendicular to the axial direction of the fixing opening having at least one dimension greater than a diameter of the threaded blind bore (24), extending around the bore, each of the positioning pins (16, 22) comprises a threaded shaft (22b) to enable it to be secured by screwing in the threaded bore (24) of the fixing opening and an annular flange (30) having a dimension greater than the diameter of the shaft for bearing on the support surface (26a), and each of the positioning pins (16, 22) is retained, after screwing and locking in the core support plate (19) or in the upper core plate (9), by a gudgeon (31) engaging in the flange (30) of the positioning pin (16, 22) and in a cavity (32) in the corresponding plate (9, 19) and made inseparable from the positioning pin (16, 22) and the corresponding plate (9, 19).

* * * * *